(12) United States Patent
Albats, Jr. et al.

(10) Patent No.: US 6,969,844 B2
(45) Date of Patent: Nov. 29, 2005

(54) MULTIPLE-AXIS LINEARLY-PROPELLED ROTATING SENSOR APPARATUS

(75) Inventors: Paul Albats, Jr., Ridgefield, CT (US); Macyln Burns, Danbury, CT (US); Mark Dalton, Brookfield, CT (US); Anthony DeRubeis, Danbury, CT (US); Cliff Evans, Newtown, CT (US); Jakob Haldorsen, Norwalk, CT (US); Thorkild Hansen, Brighton, MA (US); Douglas E. Miller, Sandy Hook, CT (US); Michael L. Oristaglio, Newtown, CT (US)

(73) Assignee: Witten Technologies, Inc., Washington, DC (US)

( * ) Notice: Subject to any disclaimer, the term of this patent is extended or adjusted under 35 U.S.C. 154(b) by 0 days.

(21) Appl. No.: 10/085,373

(22) Filed: Feb. 28, 2002

(65) Prior Publication Data

US 2002/0105469 A1   Aug. 8, 2002

Related U.S. Application Data

(63) Continuation of application No. 09/703,570, filed on Nov. 1, 2000, now Pat. No. 6,388,629.

(51) Int. Cl.⁷ ............................................. G01V 3/00
(52) U.S. Cl. ..................................... 250/234; 324/323
(58) Field of Search ........................ 250/208.1, 208.2, 250/208.6, 234, 559.33; 901/46, 47; 89/36.15, 89/41.06; 348/208.4; 180/167–169; 340/436, 340/487–490, 426.25; 324/323

(56) References Cited

U.S. PATENT DOCUMENTS

| | | | |
|---|---|---|---|
| 4,636,137 A * | 1/1987 | Lemelson | 414/730 |
| 4,967,199 A | 10/1990 | Gunton et al. | 342/22 |
| 5,129,308 A * | 7/1992 | Fuereder et al. | 89/36.15 |
| 5,443,354 A * | 8/1995 | Stone et al. | 414/729 |
| 5,952,561 A | 9/1999 | Jaselskis et al. | |
| 6,161,630 A | 12/2000 | Stump et al. | |
| 6,333,631 B1 * | 12/2001 | Das et al. | 324/326 |
| 6,388,629 B1 | 5/2002 | Albats, Jr. et al. | |

OTHER PUBLICATIONS

D.J. Daniels; Surface-Penetrating Radar; The Institute of Electrical Engineers 1996; p. 200-204.
D'Zurko, Daphne, Chignell, Richard; NYGAS Technology Brief; Feb. 1999; Issue 99-681-1.

* cited by examiner

Primary Examiner—David Porta
Assistant Examiner—Stephen Yam
(74) Attorney, Agent, or Firm—McDermott Will & Emery LLP (57) ABSTRACT

A ground penetrating antenna apparatus and method are provided for locating underground objects via radar, sonar, or similar methods. The apparatus includes one or more antennas that are rotatably affixed to support extensions that also rotate, but about an axis that is different from each of the antenna axes. The apparatus includes a linear propulsion mechanism, and the support extensions may be coupled to the linear propulsion mechanism via a transmission mechanism. In one embodiment, the supporting extensions rotate at a constant rate and each antenna rotates at that same constant rate but in the opposite direction.

19 Claims, 6 Drawing Sheets

MULTIPLE-AXIS LINEARLY-PROPELLED ROTATING SENSOR APPARATUS

RELATED APPLICATIONS

This application claims the benefit of U.S. patent application Ser. No. 09/703,570, filed Nov. 1, 2000, entitled "Rotating Scanning Antenna Apparatus and Method for Locating Buried Objects," now U.S. Pat. No. 6,388,629 issued May 14, 2002, the disclosure of which is entirely incorporated herein by reference.

FIELD OF THE INVENTION

This invention relates to a rotating, linearly propelled scanning antenna apparatus and method using radar, sonar, or the like, for use in locating buried objects.

BACKGROUND

In many applications it is important to be able to quickly and accurately locate objects such as pipes, cables, mines, and barrels that are buried beneath the surface of the earth. Such objects may be located using Ground Penetrating Radar ("GPR") techniques in which electromagnetic waves are transmitted into the ground and reflected. (The term 'ground' includes soil, concrete, asphalt, and the like.) The reflections are analyzed according to methods that are well known in the art to determine the location of any object that may be buried there beneath. Other methods well known in the art may also be used, including sonar techniques and inductive techniques.

GPR techniques use transmitting antennas to emit the electromagnetic waves that propagate into the ground and interact with the buried objects. This interaction results in a scattered wave, which is measured by the receiving antenna of the GPR device. By changing the location of the transmitting antenna and recording the corresponding signal that is received and then output by the receiving antenna as a function of time (or frequency) and location, one obtains the radar data from which the information about the buried objects may be extracted. However, for the radar data to be useful, the positions of the measurement locations must be accurately known. Further, it is important for cost efficiency that the system be able to cover a large area in a short period of time; that is, it is important that the system have a high survey speed, which means that the antenna must travel at a high speed.

Such high speed movement may create undesirable mechanical stresses on the antennas. For example, in the simplest scanning system the antenna moves linearly back and forth across the width of the scanning area. This back and forth linear motion requires that the antenna slow down, stop, and then speed up each time it reaches the edge of the scanning area. This type of back and forth movement creates tremendous mechanical stresses in the antennas and survey system when the system is operated at a high survey speed. In fact, these extreme stresses severely limit the survey speed that is obtainable with a linear scanning system.

It is an object of the current invention to provide a rotating GPR system for which the antenna speed and survey speed can be very high without causing excessive mechanical stresses on the antennas and scanning system. With a rotating system, the antennas do not have to slow down when they reach the edge of the scanning area, but instead may operate at a constant speed. As a consequence, the mechanical stresses are much less for a rotating GPR system than for a linear GPR system.

A rotating GPR system is described in U.S. Pat. No. 4,967,199 ("Ground Probing Radar Method and Apparatus") to Gunton et al. and in *Surface Penetrating Radar* by D. J. Daniels (IEE Press, 1996, pp. 200–204). Those references describe a system in which the antennas are interleaved spirals whose axes correspond with the axis of rotation. Further, unlike the present invention, the rotation in these systems is used solely to reduce clutter rather than to move the antenna system along the ground.

SUMMARY OF THE INVENTION

According to the objects of the present invention, a ground penetrating antenna apparatus is described providing an antenna housing, one or more supporting extensions that are rotatably affixed to the antenna housing about a first axis, at least one antenna that has transmit and receive elements and that is rotatably affixed to a supporting extension about a second axis that is different from the first axis, a linear propulsion mechanism that is attached to the housing so that the housing may be moved over the ground, an impulse generator that is electrically coupled to each transmit element so as to provide pulses to each transmit element, and a sampling unit that is electrically coupled to each receive element so as to receive the output from each receive element.

In one embodiment of the present invention, the ground penetrating antenna apparatus comprises radar antennas. In a further embodiment, a supporting extension is responsive to the linear propulsion mechanism. In yet another embodiment, a supporting extension is coupled to the linear propulsion mechanism via a transmission mechanism.

In one embodiment of the present invention, each supporting extension rotates at a constant rate of rotation. In another embodiment, each supporting extension rotates at a constant rate and the antenna rotates at a constant rate of rotation that is equal in magnitude and opposite in direction to the constant rate of rotation of each supporting extension.

In one embodiment of the present invention, the linear propulsion mechanism comprises a cart that is coupled to the housing and a means for propelling the cart. In another embodiment, the linear propulsion mechanism comprises a self-propelled vehicle that is coupled to the housing.

In one embodiment of the present invention, the ground penetrating antenna apparatus further comprises a data storage device for storing the radar data collected from the sampling unit. In another embodiment, the apparatus further comprises a position indicator that is coupled to the supporting extension and the linear propulsion mechanism. In yet another embodiment, the apparatus further comprises a data storage device for storing the radar data collected from the sampling unit and the position data collected from the position indicator. In another embodiment, each element of the radar data corresponds to a unique element of the position data.

Also in accordance with the objects of the present invention, a method is provided for locating underground objects within a surface area consisting of providing a housing that is adapted for linear movement, providing a supporting extension that is rotationally coupled to the housing about an axis, providing an antenna that is rotationally coupled to a supporting extension about an axis different from said axis of said supporting extension, providing electronics coupled to the antenna that is capable of receiving ground penetrating antenna data, rotating a supporting extension about the axis of the supporting extension, rotating the antenna about the axis of the antenna, moving the housing along a path within the surface area, receiving ground penetrating antenna data at selected positions along the path, recording the ground penetrating antenna data and the selected positions, and analyzing the recorded antenna data and the recorded selected positions to locate underground objects. In one embodiment, the antenna is a radar antenna.

In one embodiment of the present invention, the step of rotating a supporting extension further comprises rotating a supporting extension at a constant rate of rotation. In another embodiment, the rotating step comprises rotating an antenna at a constant rate that is equal in magnitude and opposite in direction to the constant rate of rotation of a supporting extension.

In one embodiment of the present invention, the step of moving the housing further comprises moving the housing responsively to rotating a supporting extension. In another embodiment, the step of moving the housing further comprises providing a cart that is coupled to the housing and propelling the cart. In yet another embodiment, the step of moving the housing further comprises providing a self-propelled cart that is couples to the housing. In another embodiment, the recorded antenna data is converted from polar coordinates to rectangular coordinates.

DETAILED DESCRIPTION

One embodiment of the present invention uses a radar system that includes a radar antenna attached to the end of a rotating arm whose axis of rotation is perpendicular to the ground. The system moves along the ground in a linear path while the rotating arm (and the attached antenna) turn about their axes of rotation. With the present system, the radar antennas rotate about axes that are independent of the central axis of rotation. In this way, the present system permits a larger coverage area than is provided by a single axis system. Further, with a multiple axis system, it is possible for the antennas to maintain a fixed orientation regardless of the position of the arm to which they are attached. For example, in a system with two antennas, each antenna may rotate about its own axis at the same rotational speed as the arm but in an opposite direction, thereby maintaining a constant orientation with respect to the linear movement of the system. Typically the forward linear motion of the system will be much slower than the rotating motion of the antenna, so that after one revolution of the antenna, its position will have changed by only a small fraction of the radius of the rotating arm. In a second embodiment, an antenna may be attached to each end of the rotating arm. The width of the survey area is equal to twice the radius of the rotating arm.

Figure 1:
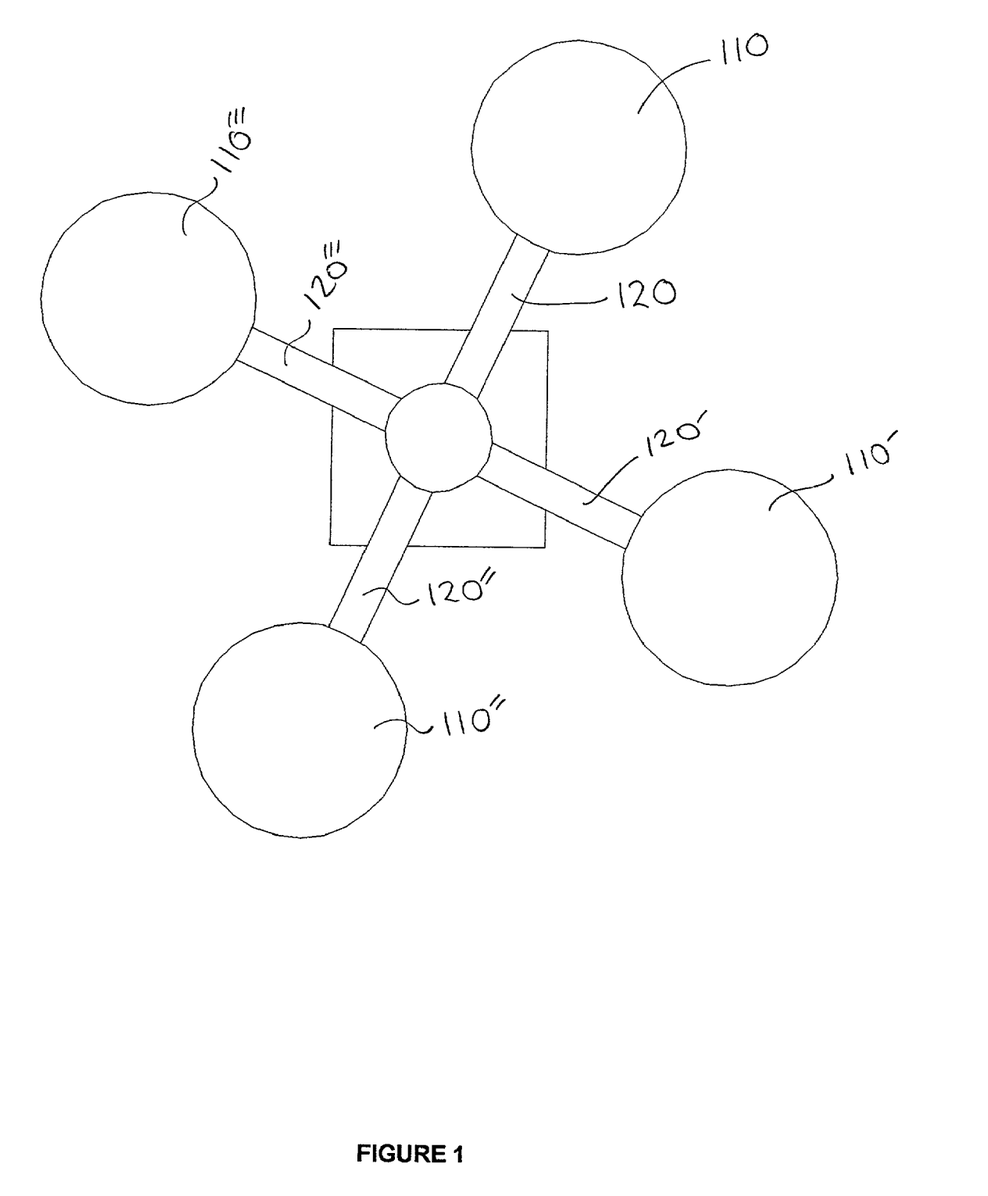
FIG. 1 is a top view of a four antenna apparatus in accordance with the present invention having two arms (i.e., four supporting extensions).
Figure 2:
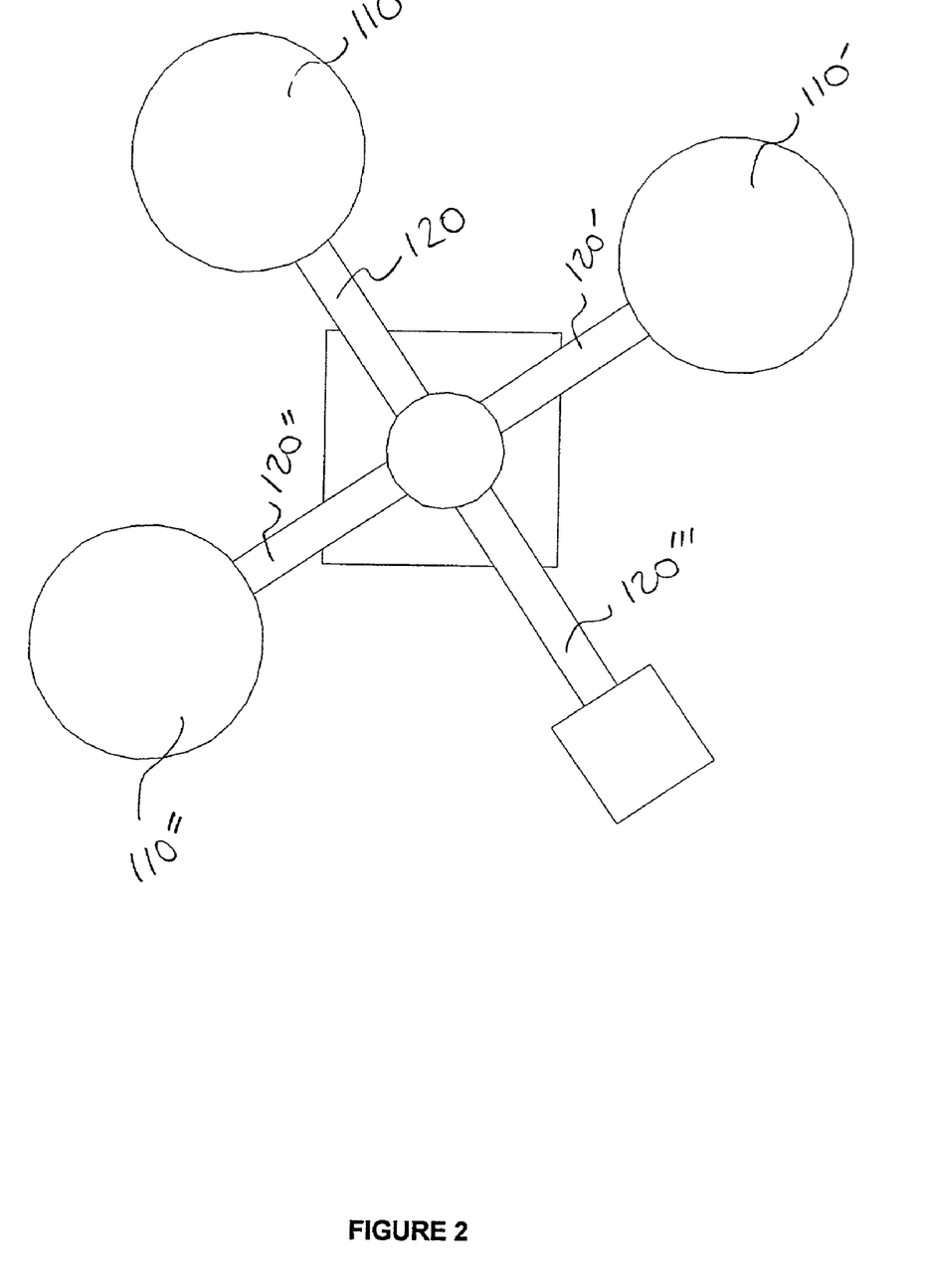
FIG. 2 is a top view of a three antenna apparatus in accordance with the present invention having two arms (i.e., four supporting extensions).
Figure 3:
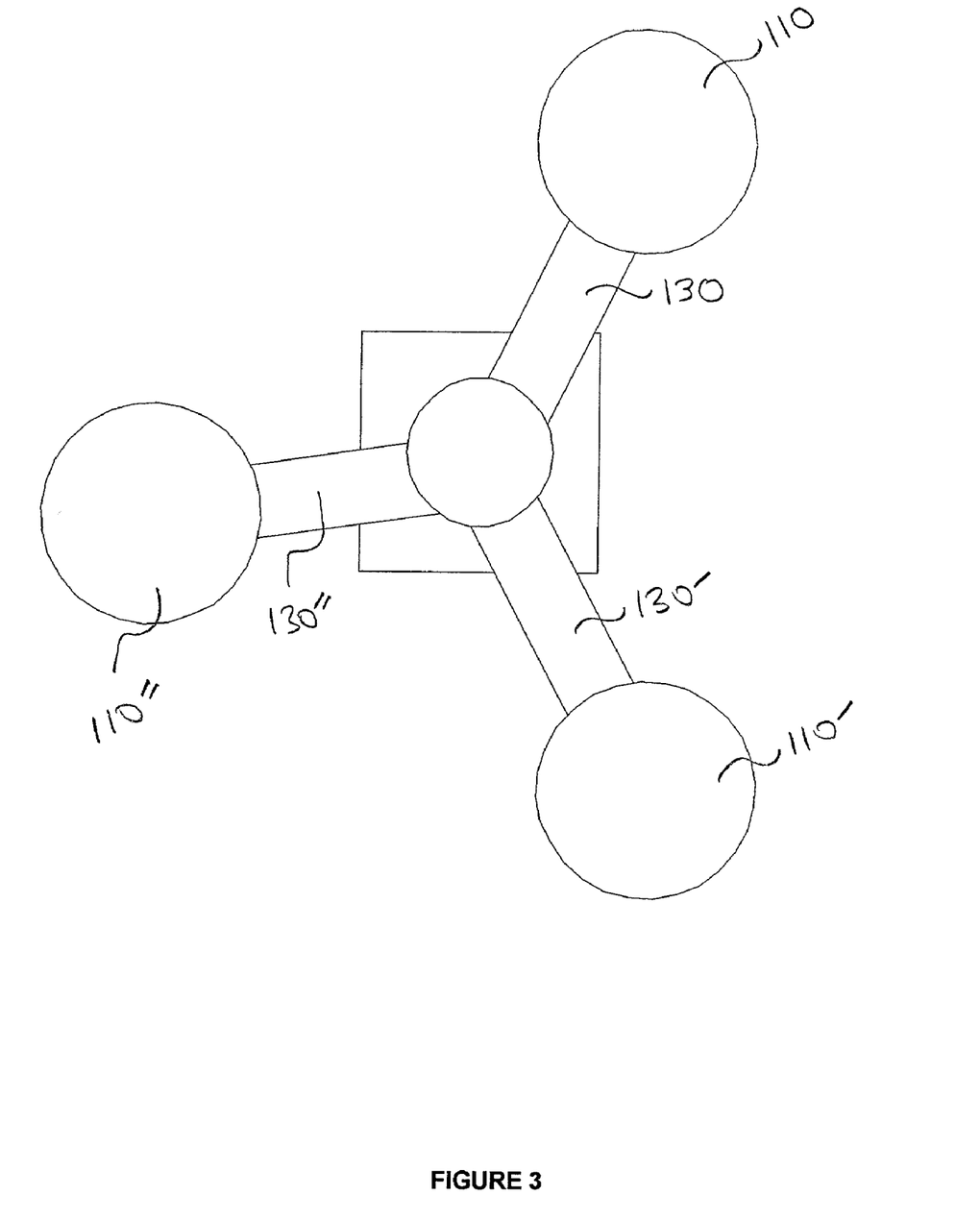
FIG. 3 is a top view of a three antenna apparatus in accordance with the present invention having three spokes (i.e., three supporting extensions).

Although the embodiment described below includes a single rotating arm with either an antenna at one end or an antenna at both ends, the present invention is not limited to those configurations. Instead, the system could contain multiple arms. For example, referring to FIG. 1, a four-antenna system could contain two arms (i.e., four extensions 120, 120', 120'', 120''') with an antenna 110 at the end of each extension 120. Alternately, as shown in FIG. 2, a three-antenna system could contain two arms (i.e., four extensions 120, 120', 120'', 120''') with an antenna 110 at the end of three extensions 120, 120', and 120'', but no antenna at the end of the fourth extension 120'''. Instead of arms, the system could use spokes. For example, referring to FIG. 3, a three-antenna system could contain three spokes (i.e., three extensions 130, 130', 130''), with an antenna 110 at the end of each extension. In this way, any number (odd or even) of antennas can be accommodated using either an arm or a spoke configuration. In this description, the term "supporting extension" will include both arm extensions and spoke extensions. For example, a system with two arms would have four supporting extensions, whereas as a system with three spikes would have three supporting extensions.

Figure 4:
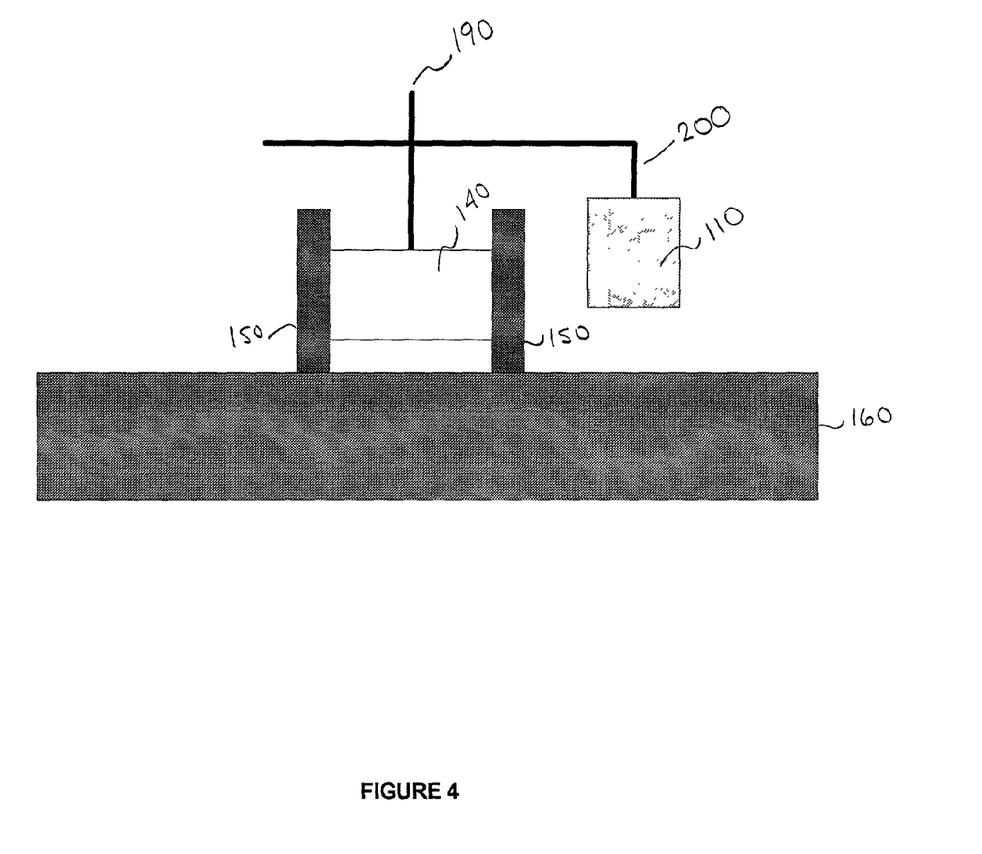
FIG. 4 is a side view of an apparatus in accordance with the present invention with two antennas.
Figure 5:
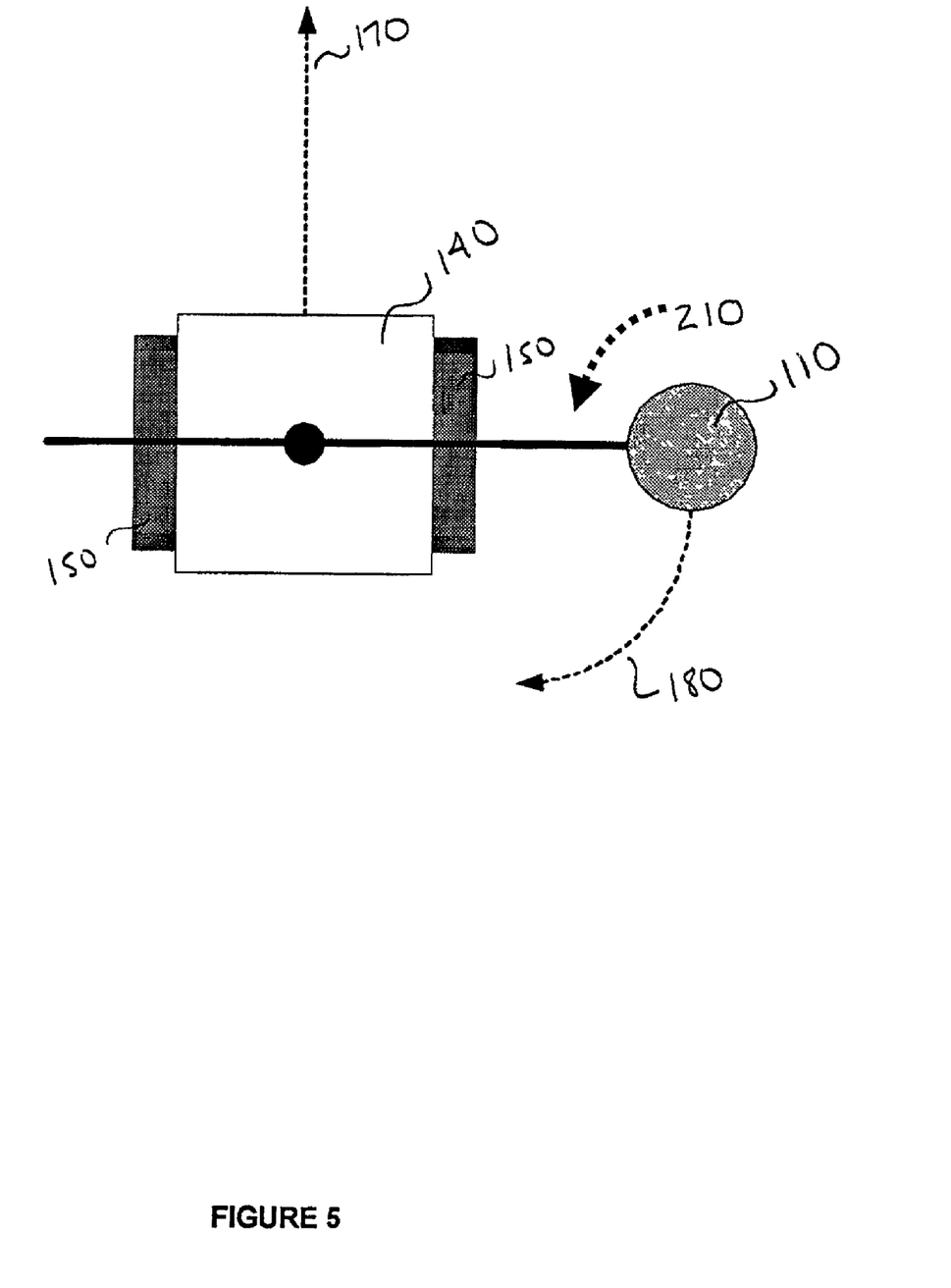
FIG. 5 is top view of an apparatus in accordance with the present invention with one antenna.

FIG. 4 and FIG. 5 show a side view and a top view, respectively, of a system with an antenna array consisting of a single antenna 110. Housing 140 is shown with wheels 150 on ground 160. Also shown are the direction of linear motion 170, the axis of rotation 190 for the antenna array, the axis of rotation 200 for the single antenna 110, the direction of rotating motion 180 about axis 190 for the antenna array, and the direction of rotation 210 for antenna 110 about axis 200.

In one embodiment, the rotating motion is provided by a direct connection to the linear driving mechanism via, for example, a gear mechanism linking the axle of the center arm to an axle of a wheel on a transporting vehicle. With this embodiment, the system moves forward a fixed distance for each 360° of rotational movement. However, it is not necessary for the rotating mechanism to be directly connected to the linear driving mechanism provided that the angular position of the antennas and the position of the axis of rotation are known at each data collection point. There are two advantages to providing a system in which the rotational mechanism is not linked to the linear driving mechanism. First, with separate systems the rotational speed can remain constant even when the linear speed varies due, for example, to obstacles or hills in the survey area. (Maintaining a constant linear speed under such conditions is difficult.) Second, the motor that provides the rotational motion can be relatively small since only a small amount of work is required to maintain a constant rotational speed.

Figure 6:
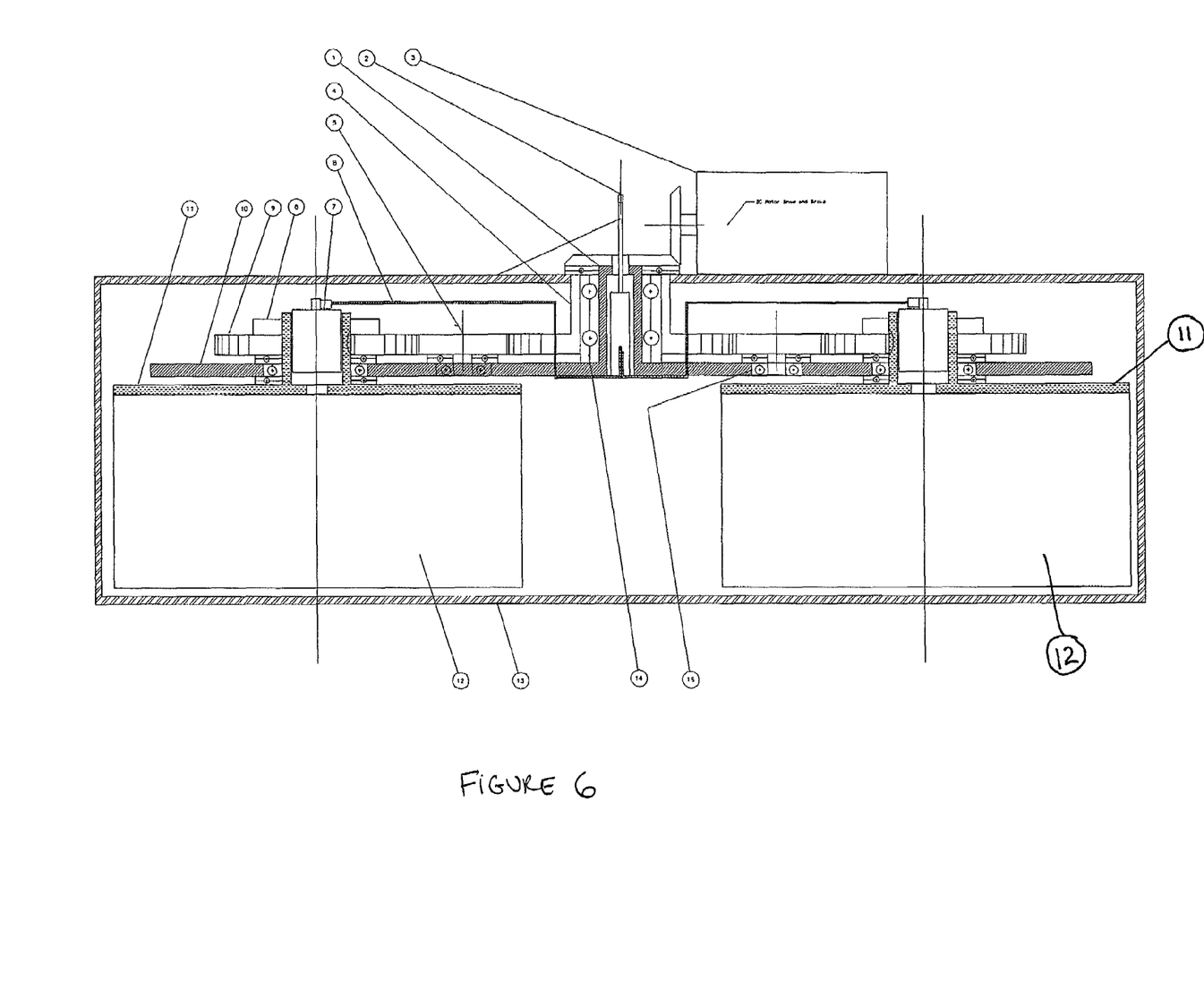
FIG. 6 is a side view of an apparatus in accordance with the present invention with one antenna.

One such GPR system with an antenna at each end of the rotating arm is shown in FIG. 6. In particular, a separate antenna is attached to each of the two support plates 11. Each antenna is contained within a separate antenna enclosure 12. The rotating parts of the system are enclosed within housing 13. The support plates 11 are attached through thrust bearings 15 to a support collar 10, which in this embodiment is the rotating arm itself. Each thrust bearing 15 is supported by a collar 8. The power and data cables for each antenna pass through rotational electrical connectors 7, connect to cable 6, and exit housing 13 through the main rotational electrical connector 2. The axis of rotation of the support carrier 10 is the center of rotational hub 1, which is attached to bearing 14. The rotating motion is sustained by drive assembly 3, which includes an electric motor. The support plates 11 preferably counter-rotate so that the antenna orientation remains constant. This counter-rotation may be achieved by stationary gear 4 that is attached in FIG. 6 directly to support carrier 10, walking gear 5, and drive gear 9.

The linear motion of the system can be provided by a number of different drive systems, all well known in the art. For example, the entire system could be mounted on a cart that is pulled by a vehicle or a winch. Alternately, the system could be mounted directly onto a self-propelled vehicle or the linear motion could be linked directly to the rotational drive mechanism.

The angular position of the arm may be determined by using an encoder that measures the angle between the central arm and some fixed direction. Such encoders are well known in the art and may be obtained, for example, from Litton Poly-Scientific of Blacksburg, Va.

The position of the system along its linear path can be determined using a number of techniques that are well known in the art. For example, a survey wheel could be attached to the vehicle that moves the system along the ground. Such a survey wheel could provide a measurement of the distance traveled by the vehicle. This information could then be combined with the information from the encoder to provide a record of antenna position corresponding to each radar data collection point. The radar data and the positional data could be continuously merged into a single file for subsequent processing. If the linear motion and the rotational motion remain constant throughout the data collection, then it is not necessary to continuously merge the radar and position data.

Systems for providing the actual radar electronics and methods for analyzing radar data to determine object locations are well known in the art and any such system and method may be used with the present invention. The radar electronics and the mechanical transport and rotational system are connected through various encoders that indicate when the radar system should take a data reading. For example, the radar system could be set to take one measurement for every 10° of rotation of the central arm or for every 1 inch of travel in the forward direction.

With regard to the analysis of the data collected, it should be noted that many analysis routines assume that the input data is provided in a rectangular grid. Although data collected in accordance with the disclosed embodiments will not be in a rectangular grid, it may be converted to a rectangular grid via standard interpolation techniques that are well known to those of skill in the art.

Finally, although this invention has been described via an embodiment based on radar antennas, it is not intended that the present invention be limited to radar signals. One of skill in the art would know of numerous other sensors that could be used to practice the present invention. Further, one of skill in the art would understand how the described embodiment could be modified to accommodate other sensors. For example, the present invention could be used with inductive sensors or sonar sensors. Further, various types of sensors could be combined in the same system.

The present invention, therefore, is well adapted to carry out the objects and obtain the ends and advantages mentioned above, as well as others inherent herein. All presently preferred embodiments of the invention have been given for the purposes of disclosure. Where in the foregoing description reference has been made to elements having known equivalents, then such equivalents are included as if they were individually set forth. Although the invention has been described by way of example and with reference to particular embodiments, it is not intended that this invention be limited to those particular examples and embodiments. It is to be understood that numerous modifications and/or improvements in detail of construction may be made that will readily suggest themselves to those skilled in the art and that are encompassed within the spirit of the invention and the scope of the appended claims.

We claim:

1. A movable sensor apparatus, comprising:
    a movable housing;
    at least one supporting extension wherein each said supporting extension is rotatably affixed to said housing, being fully rotatable about a first axis;
    at least one sensor for sensing an object buried beneath a surface of the earth, wherein each at least one sensor is rotatably affixed to one of said at least one supporting extension and is fully rotatable about a second axis substantially parallel to and offset from said first axis so as to scan an area of the surface of the earth;
    a linear propulsion mechanism attached to said housing whereby said housing may be moved over the ground;
    a mechanism to fully rotate each at least one supporting extension about the first axis and to fully rotate each at least one sensor about the second axis, so as to cause the at least one sensor to scan the area of the surface of the earth as said housing moves across said area;
    a triggering unit electrically coupled to each of said at least one sensor and capable of separately activating each of said at least one sensor; and
    a sampling unit electrically coupled to each of said at least one sensor and capable of receiving output from each of said at least one sensor.

2. The movable sensor apparatus of claim 1 wherein said sensor is a sensing device selected from the group consisting of a magnetometer an electromagnetic induction sensor, a radar sensor and a sonar sensor.

3. The movable sensor apparatus of claim 1 wherein each said supporting extension rotates at a constant rate of rotation.

4. The movable sensor apparatus of claim 3 wherein each said sensor rotates at a constant rate of rotation that is equal in magnitude and opposite in direction to said constant rate of rotation of each said supporting extension to maintain orientation of the at least one sensor relative to a substantially linear direction of movement of the housing.

5. The movable sensor apparatus of claim 1 further comprising a position indicator coupled to at least one said supporting extension and said linear propulsion mechanism.

6. The movable sensor apparatus of claim 5 further comprising a data storage device for storing sensor data collected from each of said at least one sensor and position data collected from said position indicator.

7. The movable sensor apparatus of claim 1, wherein the first and second axes are substantially perpendicular to the ground.

8. A movable sensor apparatus, comprising:
    a movable housing;
    a first supporting extension rotatably affixed to said housing, being fully rotatable about a first axis;
    a second supporting extension rotatably affixed to said housing being fully rotatable about said first axis;
    a first buried object sensor that is rotatably affixed to said first supporting extension, being fully rotatable about a second axis substantially parallel to and offset from said first axis;
    a second buried object sensor that is rotatably affixed to said second supporting extension, being fully rotatable about a third axis substantially parallel to and offset from said first axis and said second axis;

a linear propulsion mechanism attached to said housing whereby said housing may be moved over the ground;

a mechanism to fully rotate each supporting extension about the first axis and to fully rotate the first and second buried object sensors about the second and third axes respectively, so as to cause the sensors to scan an area of the surface of the earth as said housing moves across said area;

a triggering unit electrically coupled to said first sensor and said second sensor and capable of separately activating said first sensor and said second sensor; and, a sampling unit electrically coupled to said first sensor and said second sensor and capable of receiving output from said first sensor and said second sensor.

9. The movable sensor apparatus of claim 8 wherein each of said first and second sensors is a sensing device selected from the group consisting of a radar sensor, an electromagnetic induction sensor, a magnetometer and a sonar sensor.

10. The movable sensor apparatus of claim 9, wherein said first sensor is a different selected one of said sensing devices than is said second sensor.

11. The movable sensor apparatus of claim 8, wherein the first, second and third axes are substantially perpendicular to the ground.

12. A movable sensor apparatus, comprising:
a movable housing;
a propulsion mechanism attached to said housing whereby said housing may be moved in a direction over the ground;
a support which rotates fully about a first axis;
a sensor for sensing a characteristic of the ground, mounted on the support so as to fully rotate about a second axis substantially parallel to the first axis and so as to observe the ground as the housing is moved over the ground; and
a drive mechanism for driving rotation of the support at a first rate and for driving rotation of the sensor at a second rate during rotation of the support and in a direction opposite to rotation of the support, wherein a relationship of the second rate of rotation to the first rate of rotation is such that orientation of the sensor relative to the direction of movement over the ground remains substantially constant during rotation of the support and the sensor.

13. The movable sensor apparatus of claim 12, wherein the sensor is a sensing device selected from the group consisting of a magnetometer, an optical camera, an electromagnetic induction sensor, a radar sensor and a sonar sensor.

14. The movable sensor apparatus of claim 12 wherein the second rate of rotation is constant and equal in magnitude and opposite in direction to the first rate of rotation.

15. The movable sensor apparatus of claim 12, further comprising:
another sensor for sensing a characteristic of the ground mounted on the support so as to fully rotate about a third axis substantially parallel to and offset from the first axis; wherein:
the sensor drive mechanism is also for driving rotation of the other sensor at a third rate during rotation of the support and in a direction opposite to rotation of the support, and
a relationship of the third rate of rotation to the first rate of rotation is such that orientation of the other sensor relative to the direction of movement remains substantially constant during rotation.

16. The movable sensor apparatus of claim 15, wherein a first one of the sensors is a first sensing device selected from the group consisting of a magnetometer, an optical camera, an electromagnetic induction sensor, a radar sensor and a sonar sensor.

17. The movable sensor apparatus of claim 16, wherein a second one of the sensors is a second sensing device selected from the group consisting of a magnetometer, an optical camera, an electromagnetic induction sensor, a radar sensor and a sonar sensor.

18. The movable sensor apparatus of claim 17, wherein the first and second sensing devices are different from each other.

19. The movable sensor apparatus of claim 15, wherein each of the second and third rates of rotation is constant and equal in magnitude and opposite in direction to the first rate of rotation. camera and said second sensor is a sonar sensor.

* * * * *